United States Patent
Li et al.

(10) Patent No.: US 10,691,271 B2
(45) Date of Patent: Jun. 23, 2020

(54) METHOD FOR DETERMINING TOUCH POSITION AND TOUCH CONTROL CHIP

(71) Applicant: SHENZHEN GOODIX TECHNOLOGY CO., LTD., Shenzhen (CN)

(72) Inventors: Gang Li, Shenzhen (CN); Haijun Peng, Shenzhen (CN); Wing Ho Pang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 14 days.

(21) Appl. No.: 16/179,923

(22) Filed: Nov. 3, 2018

(65) Prior Publication Data

US 2019/0073062 A1 Mar. 7, 2019

Related U.S. Application Data

(63) Continuation of application No. PCT/CN2017/095402, filed on Aug. 1, 2017.

(51) Int. Cl.
*G06F 3/041* (2006.01)
*G06F 3/044* (2006.01)
*G01D 5/241* (2006.01)

(52) U.S. Cl.
CPC .......... *G06F 3/044* (2013.01); *G01D 5/241* (2013.01); *G06F 3/0412* (2013.01); *G06F 3/04182* (2019.05); *G06F 3/0446* (2019.05); *G06F 2203/04101* (2013.01)

(58) Field of Classification Search
CPC .. G06F 3/04182; G06F 3/0412; G06F 3/0418; G06F 3/0421; G06F 3/042; G06F 3/0446; G06F 3/044
See application file for complete search history.

(56) References Cited

U.S. PATENT DOCUMENTS

| 7,876,311 | B2 * | 1/2011 | Krah .................. G06F 3/044 |
| | | | 178/18.01 |
| 9,110,546 | B2 * | 8/2015 | Kim ................... G06F 3/044 |
| 9,170,675 | B2 * | 10/2015 | Mo .................... G06F 3/044 |
| 9,886,133 | B2 * | 2/2018 | Zhao ................ G06F 3/0412 |
| 10,152,148 | B2 * | 12/2018 | Kuo .................. G06F 3/041 |
| 2011/0119320 | A1 | 5/2011 | Wu et al. |
| 2012/0182235 | A1 | 7/2012 | Lee et al. |

(Continued)

FOREIGN PATENT DOCUMENTS

| CN | 102968230 A | 3/2013 |
| CN | 103543888 A | 1/2014 |
| KR | 20140096528 A | 8/2014 |

*Primary Examiner* — Vijay Shankar

(57) ABSTRACT

The present application provides a method for determining a touch position and a touch control chip. The method includes: determining a variation caused by a noise to raw data of a capacitive touch screen; performing noise processing on a first raw value set of the capacitive touch screen according to the variation caused by the noise to the raw data of the capacitive touch screen, to obtain a first processed data set; and determining a touch position on the capacitive touch screen according to the first processed data set. The method for determining a touch position and the touch control chip provided by the present application contribute to improving accuracy of the touch position.

18 Claims, 4 Drawing Sheets

(56) References Cited

U.S. PATENT DOCUMENTS

| | | |
|---|---|---|
| 2013/0127756 A1 | 5/2013 | Wang et al. |
| 2015/0309603 A1 | 10/2015 | Kuo et al. |
| 2017/0115820 A1* | 4/2017 | Zhao .................... G06F 3/0412 |

* cited by examiner

METHOD FOR DETERMINING TOUCH POSITION AND TOUCH CONTROL CHIP

CROSS-REFERENCE TO RELATED APPLICATIONS

The present application is a continuation of international application No. PCT/CN2017/095402, filed on Aug. 1, 2017, which is hereby incorporated by reference in its entireties.

TECHNICAL FIELD

The present application relates to the field of capacitive touch, and more particularly, to a method for determining a touch position and a touch control chip.

BACKGROUND

A capacitive touch screen is a human-machine interaction apparatus that mainly consists of a driving electrode and a sensing electrode. A touch control chip may drive signals with different frequencies to the driving electrode by configuration, and the sensing electrode is responsible for receiving signals. An operation, such as digital signal processing, is performed on the signals received by the sensing electrode, to obtain raw value data. The touch control chip can determine a position of a touch point on the capacitive touch screen according to the raw value data.

The capacitive touch screen is often affected by a common mode noise during use, such as a noise of a charger. In a case of a common mode interference noise, if the raw value data is mixed with noise data, it would result in abnormal mutual capacitance data, which will result in a phenomenon, such as point appearing or point disappearing or coordinate jittering when it reacts to the touch position, thereby affecting accuracy of the touch position on the capacitive touch screen.

SUMMARY

The present application provides a method for determining a touch position and a touch control chip, which contribute to improving accuracy of the touch position.

In a first aspect, the present application provides a method for determining a touch position. The method includes: determining a variation caused by a noise to raw data of a capacitive touch screen; performing noise processing on a first raw value set of the capacitive touch screen according to the variation caused by the noise to the raw data of the capacitive touch screen, to obtain a first processed data set; and determining a touch position on the capacitive touch screen according to the first processed data set.

In the method, a touch position on a capacitive touch screen is determined according to a variation caused by a noise to raw data of the capacitive touch screen, which contributes to improving accuracy of the touch position.

Optionally, the variation caused by the noise to the raw data of the capacitive touch screen may include: a variation caused by the noise to an amplitude of the raw data of the capacitive touch screen, that is, an amplitude variation caused by the noise to the raw data of the capacitive touch screen; or a variation caused by the noise to a phase of the raw data of the capacitive touch screen, that is, a phase variation caused by the noise to the raw data of the capacitive touch screen; or both the foregoing phase variation and amplitude variation.

with reference to the first aspect, in a first possible implementation manner, the performing the noise processing on the first raw value set of the capacitive touch screen according to the variation caused by the noise to the raw data of the capacitive touch screen, to obtain the first processed data set includes: determining, according to the variation caused by the noise to the raw data of the capacitive touch screen, a first ratio of each second processed data in a second processed data set of the capacitive touch screen to corresponding data in the first processed data set, where the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and performing, by means of recursive filtering, the noise processing on the first raw value set according to the second processed data set and the first ratio, to obtain the first processed data set.

In this implementation manner, a ratio of second processed data in a history data set (that is, the second processed data set) to data in a current data set (that is, the first processed data set) is determined according to the variation caused by the noise to the raw data of the capacitive touch screen, and then the current data set for determining the touch position is obtained using a recursive filtering method according to the history data set and a current raw value set (that is, the first raw value set). The first processed data is a data set after the noise processing, and the touch position is determined according to the first processed data set, which contributes to improving accuracy of the touch position.

Optionally, the greater the variation caused by the noise to the raw data of the capacitive touch screen is, the greater the first ratio is.

Namely, the greater the variation caused by the noise to the raw data of the capacitive touch screen is, the greater a ratio of the history data set to the data set obtained after the noise processing is, the less a ratio of current raw value data affected by the noise to the data set after the noise processing is, thereby improving the accuracy of the touch position.

With reference to the first possible implementation manner, in a second possible implementation manner, the first ratio is 1 when the variation caused by the noise to the raw data of the capacitive touch screen is greater than a configured first threshold value.

Namely, data in the first processed data set is all data in the second processed data set when the variation caused by the noise to the raw data of the capacitive touch screen is greater than the configured first threshold value.

With reference to the first or second possible implementation manner, in a third possible implementation manner, the determining, according to the variation, the first ratio of each second processed data in the second processed data set of the capacitive touch screen to the corresponding data in the first processed data set includes: determining, according to a maximum difference between a raw value in the first raw value set and the data in the second processed data set, a second ratio of each data in the second processed data set to corresponding data in the first processed data set; and obtaining the first ratio according to the variation and the second ratio.

With reference to the third possible implementation manner, in a fourth possible implementation manner, the first ratio is equal to the second ratio when the variation caused by the noise to the raw data of the capacitive touch screen is less than or equal to a configured second threshold value.

Namely, the second ratio is not adjusted when the variation caused by the noise to the raw data of the capacitive touch screen is less than or equal to the configured second threshold value, and the second ratio may directly serve as the first ratio.

The Second Threshold Value May be Equal to the First Threshold Value.

With reference to the fourth possible implementation manner, in a fifth possible implementation manner, when the variation caused by the noise to the raw data of the capacitive touch screen includes the phase variation caused by the noise to the raw data of the capacitive touch screen, the method further includes: determining the phase variation caused by the noise to the raw data of the capacitive touch screen.

With reference to the fifth possible implementation manner, in a sixth possible implementation manner, the determining the phase variation caused by the noise to the raw data of the capacitive touch screen includes: determining a maximum value in a difference set between a second raw value set of the capacitive touch screen and a reference value set, where the second raw value set is the raw value set acquired when the drive signal with the first frequency is output to the capacitive touch screen; determining a first sensing terminal corresponding to the maximum value; and determining the phase variation according to a phase difference between raw data corresponding to the first sensing terminal in a first raw data set of the capacitive touch screen and raw data corresponding to the first sensing terminal in a second raw data set, where the first raw data set and the second raw data set are acquired when the drive signal with the first frequency is output to the capacitive touch screen.

With reference to the sixth possible implementation manner, in a seventh possible implementation manner, the phase variation φ' satisfies the following formula:

$$\varphi' = \sum_{i=1}^{M} |\varphi_{i1} - \varphi_{i2}|$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

With reference to any one of the third to seventh possible implementation manners, in an eighth possible implementation manner, the first ratio and the second ratio satisfy the following formula:

$$R_1 = R_2 + \frac{IQ_{now} - IQ_{low}}{IQ_{high} - IQ_{now}} * (1 - R_2)$$

where $R_1$ is the first ratio, $R_2$ is the second ratio, $IQ_{high}$ is an upper limit value of the phase variation, and $IQ_{low}$ is a lower limit value of the phase variation.

Correspondingly, the second processed data set, the first ratio and the first raw value set satisfy the following formula:

RawData=RawDataNow*(1−$R_1$)+RawDataLast*$R_1$ where RawData is data in the first processed data set, RawDataNow is data in the first raw value set, and RawDataLast is data in the second processed data set.

With reference to the first aspect or any one of the foregoing possible implementation manners, in a ninth possible implementation manner, the method further includes: determining the touch position of the capacitive touch screen according to the first raw value set and the reference value set when the variation caused by the noise to the raw data of the capacitive touch screen is less than or equal to a configured third threshold value.

The third threshold value may be less than the second threshold value.

In this implementation manner, when the variation caused by the noise to the raw data of the capacitive touch screen is less than or equal to the third threshold value, that is, it is deemed that when an influence of the noise on the raw data can be ignored, the noise processing may not be performed on the first raw value set, but the touch position is directly determined according to the first raw value set and the reference value set, which, on the one hand, can provide determination efficiency of the touch position, and on the other hand, can avoid a side effect caused by the noise processing, thereby improving the accuracy of the touch position.

In a second aspect, the present application provides a touch control chip. The touch control chip includes a memory, a microprocessor control unit (microprocessor control unit, MCU), a drive circuit and a sense circuit, and the MCU includes a processor and a conversion circuit.

The memory is configured to store a computer program code, a reference value set, a captured raw value set and raw data set, and the like.

The processor is configured to perform the computer program code stored in the memory, and can control the drive circuit to output a drive signal with a corresponding frequency to a touch screen, so as to drive the touch screen to work, and the processor is further configured to acquire the raw value set, and detect a touch position or the like according to the raw value set and the like.

The conversion circuit is configured to generate the raw data set according to a sense signal captured from the touch screen by the sense circuit.

The drive circuit is configured to output the drive signal with the corresponding frequency to the touch screen under the control of the processor. The sense circuit is configured to capture the sense signal output by the touch screen under the control of the processor.

Specifically, the processor is configured to determine a variation caused by a noise to raw data of a capacitive touch screen.

The processor is further configured to perform noise processing on a first raw value set of the capacitive touch screen according to the variation, to obtain a first processed data set.

The processor is further configured to determine a touch position on the capacitive touch screen according to the first processed data set.

With reference to the second aspect, in a first possible implementation manner, the processor may be specifically configured to:

determine, according to the variation, a first ratio of each second processed data in a second processed data set of the capacitive touch screen to corresponding data in the first processed data set, where the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and perform, by means of recursive filtering, the noise processing on the first raw value set according to the second processed data set and the first ratio, to obtain the first processed data set.

With reference to the first possible implementation manner, in a second possible implementation manner, the first ratio is 1 when the variation is greater than a configured first threshold value.

With reference to the first or second possible implementation manner, in a third possible implementation manner, the processor may be specifically configured to:

determine, according to a maximum difference between a raw value in the first raw value set and second processed data in the second processed data set, a second ratio of each second processed data in the second processed data set to corresponding data in the first processed data set; and obtain the first ratio according to the variation and the second ratio.

With reference to the third possible implementation manner, in a fourth possible implementation manner, the first ratio is equal to the second ratio when the variation is less than or equal to a configured second threshold value.

With reference to the fourth possible implementation manner, in a fifth possible implementation manner, the variation caused by the noise to the raw data of the capacitive touch screen includes a phase variation caused by the noise to the raw data of the capacitive touch screen.

With reference to the fifth possible implementation manner, in a sixth possible implementation manner, the processor may be specifically configured to:

determine a maximum value in a difference set between a second raw value set of the capacitive touch screen and a reference value set, where the second raw value set is the raw value set acquired when the drive signal with the first frequency is output to the capacitive touch screen;

determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired when the drive signal with the first frequency is output to the capacitive touch screen.

With reference to the sixth possible implementation manner, in a seventh possible implementation manner, the phase variation $\varphi'$ satisfies the following formula:

$$\varphi' = \sum_{i=1}^{M} |\varphi_{i1} - \varphi_{i2}|$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data.

With reference to the seventh possible implementation manner, in an eighth possible implementation manner, the first ratio and the second ratio satisfy the following formula:

$$R_1 = R_2 + \frac{IQ_{now} - IQ_{low}}{IQ_{high} - IQ_{now}} * (1 - R_2)$$

where $R_1$ is the first ratio, $R_2$ is the second ratio, $IQ_{high}$ is an upper limit value of the phase variation, and $IQ_{low}$ is a lower limit value of the phase variation; and the second processed data set, the first ratio and the first raw value set satisfy the following formula:

$$RawData = RawDataNow*(1-R_1) + RawDataLast*R_1$$

where RawData is data in the first processed data set, RawDataNow is data in the first raw value set, and RawDataLast is data in the second processed data set.

With reference to the second aspect or any one of the foregoing possible implementation manners, the processing module is further configured to determine the touch position of the capacitive touch screen according to the first raw value set and the reference value set when the variation is less than or equal to a third threshold value.

In a possible design, a touch control chip provided by the present application may include a module configured to perform a method for determining a touch position in the first aspect or in any one of implementation manners in the first aspect, and this module may be software and/or hardware.

Another aspect of the present application provides a computer readable storage medium, the computer readable storage medium stores instructions that, when executed on a touch control chip, cause the touch control chip to perform a method for determining a touch position in the first aspect or in any one of implementation manners in the first aspect.

Another aspect of the present application provides a computer program product including instructions that, when executed on a touch control chip, cause the touch control chip to perform a method for determining a touch position in the first aspect or in any one of implementation manners in the first aspect.

DESCRIPTION OF EMBODIMENTS

Figure 1:
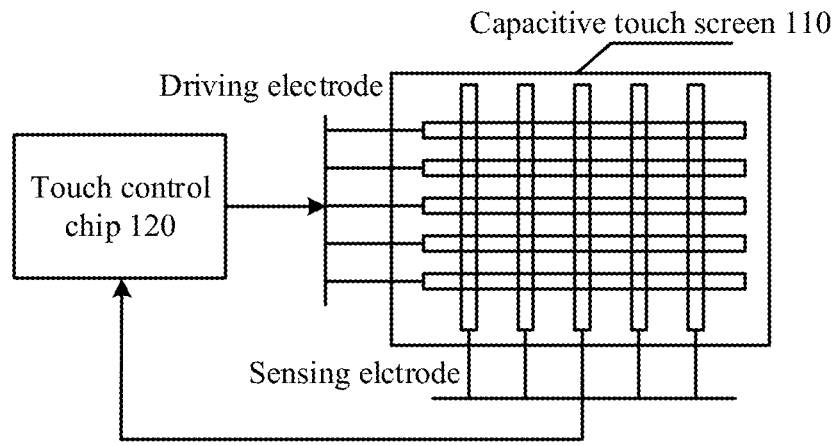
FIG. 1 is an exemplary diagram of a system of a capacitive touch screen and a touch control chip.

FIG. 1 is an exemplary diagram of a system of a capacitive touch screen and a touch control chip. It should be understood that the system illustrated in FIG. 1 is only exemplary, and the system may further include other modules or units, or include modules that are similar in function to various modules in FIG. 1. For example, a capacitive touch screen shown in FIG. 1 may be a mutual capacitance touch screen, and a capacitive touch screen in embodiments of the present application may also be a self capacitance touch screen.

As shown in FIG. 1, a capacitive touch screen 110 generally includes two sets of electrodes, one may be referred to as a driving electrode, and the other may be referred to as a sensing electrode. Where the two sets of electrodes intersect may form capacitors. That is, these two sets of electrodes constitute two electrodes of the capacitive touch screen 110.

A touch control chip 120 may also be referred to as a touch control chip or a touch controller. The touch control chip 120 may include a driving terminal (TX) and a sensing terminal (RX).

The driving terminal of the touch control chip 120 may be connected with the driving electrode of the capacitive touch screen 110, and the sensing terminal of the touch control chip 120 may be connected with the sensing electrode of the capacitive touch screen 110.

The touch control chip 120 may input a signal with a certain frequency to the driving electrode of the capacitive touch screen 110 through the driving terminal, and the signal may be referred to as a drive signal; and a signal on the sensing electrode of the capacitive touch screen 110 is captured through the sensing terminal, and the signal may be referred to as a sense signal.

Figure 2:
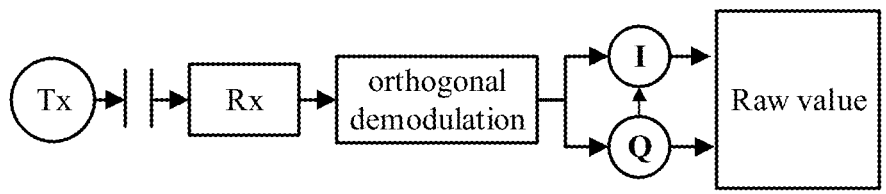
FIG. 2 is a schematic flowchart of a method for determining a touch position according to an embodiment of the present disclosure.

As shown in FIG. 2, after a driving terminal of the touch control chip 120 outputs a drive signal to a driving electrode of a capacitive touch screen, a sensing terminal of the touch control chip 120 captures a sense signal from a sensing electrode of the capacitive touch screen, and processing, such as sampling, analog-to-digital conversion and orthogonal demodulation, is performed on the sense signal, the touch control chip 120 may obtain two data I and Q. These two data can be denoted as (I, Q), which is referred to as one raw data of the capacitive touch screen 110.

After the touch control chip 120 outputs drive signals to a plurality of driving electrodes of the capacitive touch screen, receives sense signals from a plurality of sensing electrodes of the capacitive touch screen, and performs the processing of sampling, analog-to-digital conversion and orthogonal demodulation, on the plurality of sense signals, a plurality of raw data obtained may be referred to as a raw data set.

The touch control chip 120 may obtain a raw value RawData of the capacitive touch screen 110 by substitution of the raw data (I, Q) into a formula RawData=$\sqrt{I^2+Q^2}$.

The touch control chip 120 may obtain a raw value set of the capacitive touch screen 110 according to the raw data set of the capacitive touch screen 110 and the foregoing formula.

The touch control chip 120 may determine a touch position on the capacitive touch screen 110 according to the raw value set of the capacitive touch screen 110 and a reference value set, for example, which position or positions have been touched are determined according to a variation obtained by subtracting a raw value from a reference value.

There may be a noise in the obtained raw data, thereby causing that there is also a noise in a raw value obtained according to the raw data, such as a common node noise. Therefore, it is necessary to perform noise processing on the raw value, so as to cancel or reduce an influence of the noise on the raw value.

Therefore, the present application proposes a new method for determining a touch position, to improve accuracy of a touch position on the capacitive touch screen.

Figure 3:
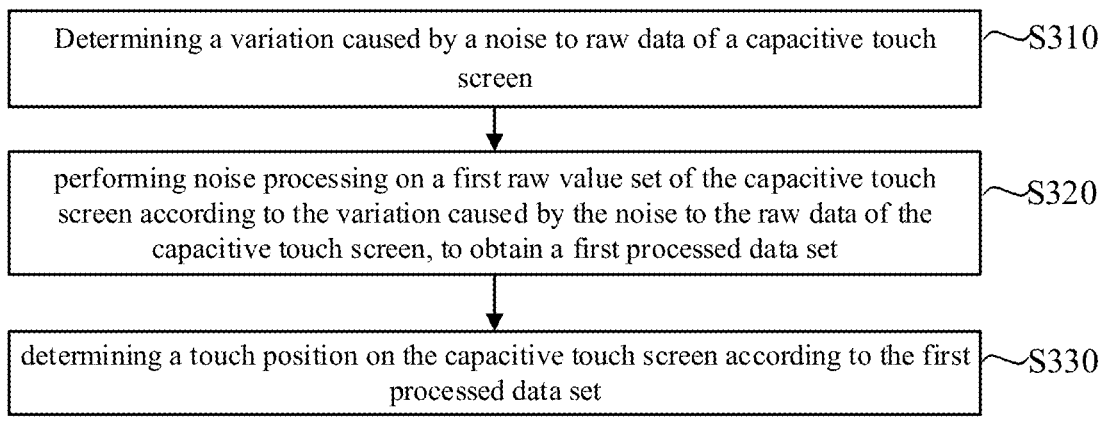
FIG. 3 is a diagram of a noise value detection principle according to an embodiment of the present application.

FIG. 3 is a schematic flowchart of a method for determining a touch position according to an embodiment of the present disclosure. It should be understood that FIG. 3 illustrates steps and operations of the method; however, these steps and operations are only exemplary, and an embodiment of the present application may also perform other operations or variations of various operations in FIG. 3. The method may be performed by a touch control chip.

S310, a variation caused by a noise to raw data of a capacitive touch screen is determined.

Here, the variation caused by the noise to the raw data may be a variation caused by the noise to an amplitude of the raw data, that is, an amplitude variation caused by the noise to the raw data; or the variation caused by the noise to the raw data may be a variation caused by the noise to a phase of the raw data, that is, a phase variation caused by the noise to the raw data; or the variation caused by the noise to the raw data may include both the foregoing amplitude variation and phase variation.

A possible determination manner of the amplitude variation caused by the noise to the raw data may include: acquiring, by the touch control chip, a raw value set when the touch control chip outputs no drive signal to the capacitive touch screen; determining the amplitude variation caused by the noise to the raw data according to the raw value set, for example, an average of all raw value data in the raw value set may serve as the amplitude variation caused by the noise to the raw data of the touch screen.

When the touch control chip outputs no drive signal to the capacitive touch screen through driving terminals, all raw values, obtained by the touch control chip according to sense signals captured from the capacitive touch screen by the sensing terminals, can be regarded as noise values.

Figure 4:
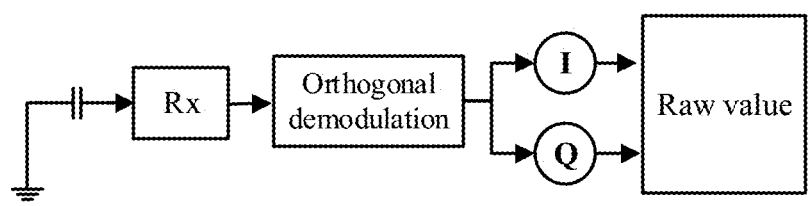
FIG. 4 is a diagram of a raw value data detection principle according to an embodiment of the present application.

A block diagram of a noise value detection principle when a touch control chip outputs no drive signal to a capacitive touch screen is shown in FIG. 4. It can be seen from FIG. 4 that when the touch control chip outputs no drive signal to the capacitive touch screen, all driving terminals of the touch control chip are grounded, all of or a part of sensing terminals of the touch control chip capture sense signals on sensing electrodes of the capacitive touch screen, and the processing, such as sampling, analog-to-digital conversion, orthogonal demodulation and the like, is performed on these sense signals. Two data I and Q can be obtained based on each sense signal, and a raw value RawData of a noise value is obtained according to a formula RawData=$\sqrt{I^2+Q^2}$. A raw value set of the capacitive touch screen can be obtained according to a plurality of sense signals.

Optionally, when the touch control chip outputs no drive signal to the capacitive touch screen, a touch control chip can capture the plurality of sense signals from some sensing terminal in a scanning period, and obtain a plurality of raw values. The touch chip can determine an amplitude variation caused by a noise to raw data of the capacitive touch screen according to the plurality of raw values, for example, the touch control chip can serve an average of the plurality of raw values as the amplitude variation caused by the noise to the raw data of the capacitive touch screen. For the convenience of subsequent description, the sensing terminal is referred to as a second sensing terminal.

Before the determination, the second sensing terminal may be determined first through the following manner: subtracting a raw value set acquired by the touch control chip when the touch control chip outputs a drive signal to the capacitive touch screen from a reference value set, to obtain a difference set; and determining a sensing terminal corresponding to a maximum difference in the difference set as the second sensing terminal.

A possible determination manner of a phase variation caused by a noise to raw data may include: determining the phase variation caused by the noise to the raw data of the capacitive touch screen according to a plurality of raw data sets of the capacitive touch screen, where these plurality of raw data sets are raw data sets acquired according to sense signals when the touch control chip outputs a drive signal to the capacitive touch screen in a plurality of periods, and these plurality of raw data sets are in one-to-one correspondence with these plurality of periods.

The plurality of periods referred to herein may include two or more periods. Further, the plurality of periods may include two adjacent periods. That is, the phase variation caused by the noise to the raw data of the capacitive touch screen may be determined according to two raw data sets of the capacitive touch screen, and the two raw data sets are raw data sets acquired according to sense signals when the touch control chip outputs a drive signal to the capacitive touch screen in two adjacent periods.

The determination of the phase variation caused by the noise to the raw data of the capacitive touch screen according to the two raw data sets of the capacitive touch screen may include: determining the phase variation caused by the noise to the raw data of the capacitive touch screen according to a phase difference set between the two raw data sets.

Figure 5:
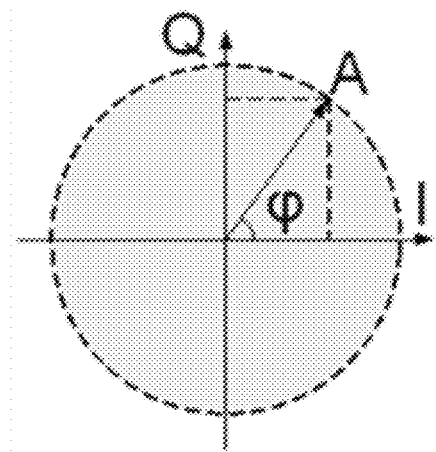
FIG. 5 is a diagram of a raw value data phase detection principle according to an embodiment of the present application.

As shown in FIG. 5, raw data I and Q corresponding to a sense signal captured by a sensing terminal is respectively mapped to a horizontal axis and a vertical axis, and an angle between a raw value A, corresponding to I and Q, and I can be understood as a phase $\varphi$ of the raw value A. The phase can be obtained according to calculation of raw data I and Q; therefore, this phase is also referred to as a phase of raw data in this embodiment.

Generally, if the raw data is not affected by a noise, $\varphi$ will not change. It should be understood that no change described here is not absolute, but it is a slight change and the change can be ignored.

If the raw data is affected by the noise, $\varphi$ changes, and a change degree of $\varphi$ is positively correlated with a magnitude of the noise. Therefore, a phase variation caused by the noise to the raw data of a capacitive touch screen may be determined according to a phase difference set between two raw data sets acquired when a touch control chip outputs a drive signal to the capacitive touch screen in two adjacent periods.

The two raw data sets may be acquired according to sense signals captured from the capacitive touch screen by one sensing terminal when the touch control chip outputs the drive signal to the capacitive touch screen in the two adjacent periods. For the convenience of subsequent description, the sensing terminal is referred to as a first sensing terminal.

Before the determination, the first sensing terminal may be determined through the following manner: subtracting a raw value set acquired when the touch control chip outputs a drive signal to the capacitive touch screen in one period from a reference value set, to obtain a difference set; and determining a sensing terminal corresponding to a maximum difference in the difference set as the first sensing terminal.

For example, when there are M*N raw values in the raw value set and there are M*N reference values in the reference value set, M*N differences can be obtained by subtracting the raw value set from the reference set, and the sensing terminal corresponding to the maximum value in the M*N differences may serve as the first sensing terminal.

After the determination of the first sensing terminal and the two raw data sets of the capacitive touch screen, the phase variation $\varphi'$ caused by the noise to the raw data of the capacitive touch screen can be obtained according to a formula $$\varphi' = \sum_{i=1}^{M} |\varphi_{i1} - \varphi_{i2}|.$$

M is a number of driving terminals of the touch control chip, or can be said to be a number of driving electrodes of the capacitive touch screen, $\varphi_{i1}$ is a phase of $i^{th}$ raw data corresponding to the first sensing terminal in a raw data set acquired in a first period of the two adjacent periods, and $\varphi_{i2}$ is a phase of $i^{th}$ raw data corresponding to the first sensing terminal in a raw data set acquired in a second period.

If a variation caused by a noise to raw data includes both the phase variation caused by the noise to the raw data and the amplitude variation caused by the noise to the raw data, the first sensing terminal and the second sensing terminal may be the same, namely, the first sensing terminal and the second sensing terminal may be a same sensing terminal.

Of course, the variation caused by the noise to the raw data of the capacitive touch screen can also be determined by other means. For example, an average of phases of a plurality of raw data, acquired when the touch control chip outputs no drive signal to the capacitive touch screen, can be determined as the variation caused by the noise to the raw data of the capacitive touch screen.

S320, noise processing is performed on a first raw value set of the capacitive touch screen according to the variation caused by the noise to the raw data of the capacitive touch screen, to obtain a first processed data set.

For example, when the capacitive touch screen has M driving electrodes and N sensing electrodes, the first raw value set may include M*N raw values, and the first processed data set obtained from the noise processing may also include M*N processed data.

Optionally, that the noise processing is performed on the first raw value set of the capacitive touch screen according to the variation caused by the noise to the raw data of the capacitive touch screen, to obtain the first processed data set may include: determining a noise processing method from a plurality of noise processing methods according to the variation caused by the noise to the raw data of the capacitive touch screen; and performing the noise processing on the first raw value set using the noise processing method, to obtain the first processed data set.

Optionally, that the noise processing is performed on the first raw value set of the capacitive touch screen according to the variation caused by the noise to the raw data of the capacitive touch screen, to obtain the first processed data set may include: determining an input parameter of a noise processing method according to the variation caused by the noise to the raw data of the capacitive touch screen, and performing the noise processing on the first raw value set according to the input parameter and the noise processing method, to obtain the first processed data set.

For example, the noise processing is performed on the first raw value set using a recursive (IIR) filtering method, that is, the noise processing is performed on each raw value RawDataNow in the first raw value set according to a recursion formula RawData=RawDataNow*(1−$R_1$)+ RawDataLast*$R_1$, to obtain each first processed data RawData in the first processed data set, and when the first processed data RawData is obtained, a first ratio $R_1$ of each second processed data RawDataLast in a second processed data set of the capacitance touch screen to corresponding first processed data RawData in the first processed data set is determined first according to the variation caused by the noise to the raw data of the capacitive touch screen.

Each second processed data RawDataLast in the second processed data set may be obtained prior to the determination, by recursive filtering a raw value set acquired when the touch control chip outputs a drive signal with a first frequency to the capacitive touch screen. The drive signal, output to the capacitive touch screen when the touch control chip acquires the first raw value set, also has the first frequency.

For example, the first raw value set may be a raw value set obtained when the touch control chip outputs the drive signal with the first frequency to the capacitive touch screen in a current period, and the second processed data set may be a data set obtained by IIR filtering a raw value acquired when the touch control chip outputs a drive signal with the first frequency to the capacitive touch screen in a previous period. The second processed data set may also be referred to as a history processed data set, the first raw value set may also be referred to as a current raw value set, and the first processed data set may also be referred to as a current processed data set.

When the first ratio $R_1$ of each second processed data RawDataLast in the second processed data set of the capacitance touch screen to the corresponding first processed data RawData in the first processed data set is determined according to the variation caused by the noise to the raw data of the capacitive touch screen, a possible implementation manner may include: determining, according to the first raw value set and the second processed data set, a second ratio of each second processed data in the second processed data set to corresponding data in the first processed data set; and obtaining the first ratio according to the variation caused by the noise to the raw data of the capacitive touch screen and the second ratio.

Namely, the second ratio is obtained first according to the first raw value set and the second processed data set, and then the second ratio is adjusted according to the variation caused by the noise to the raw data of the capacitive touch screen, to obtain the foregoing first ratio.

The specific implementation manner of obtaining the second ratio according to the first raw value set and the second processed data set can refer to an implementation manner in the existing IIR filtering manner, which is to determine a ratio of data in a history processed data set to data in a current processed data set.

The first raw value set may be subtracted from the second processed data set, to obtain a difference set; a maximum difference in the difference set is determined; the maximum difference is divided by a configured parameter, to obtain a table label; and the table label is looked up in configured ratio parameters, and the second ratio corresponding to the table label is found out. It should be understood that a correspondence relationship between a table label and a ratio parameter may be configured.

When the variation caused by the noise to the raw data of the capacitive touch screen includes a phase variation φ' caused by the noise to the raw data of the capacitive touch screen, a possible implementation manner of adjusting the second ratio according to the variation caused by the noise to the raw data of the capacitive touch screen to obtain the first ration, may include: substituting the second ratio into the following formula, to obtain the first ratio, and the formula is:

$$R_1 = R_2 + \frac{IQ_{now} - IQ_{low}}{IQ_{high} - IQ_{now}} * (1 - R_2)$$

where $R_1$ is the first ratio, $R_2$ is the second ratio, $IQ_{high}$ is an upper limit value of the phase variation φ', and $IQ_{low}$ is a lower limit value of the phase variation φ'. $IQ_{high}$ and $IQ_{low}$ may be configured or predefined values in the touch control chip.

It should be noted that, in some cases, the first ratio of each second processed data in the second processed data set to the corresponding data in the first processed data set may be embodied in other forms. For example, each first processed data in the first processed data set may be divided into N portions, then, a proportion DynamicParam of each second processed data in the second processed data set to corresponding first processed data in the first processed data set is determined, and a ratio of DynamicParam to N is the first ratio.

In this case, RawData=RawDataNow*(1−$R_1$)+ RawDataLast*$R_1$ can be expressed as:

$$RawData = \frac{RawDataNow * (128 - DynamicParam) + RawDataLast * DynamicParam}{128}$$

where N is 128.

Similarly, the second ratio may also be embodied in other forms, for example, each first processed data in the first processed data set may be divided into N portions, then, a proportion DynamicParamOld of each second processed data in the second processed data set to corresponding first processed data in the first processed data set is determined, and a ratio of DynamicParamOld to N is the second ratio.

$$R_1 = R_2 + \frac{IQ_{now} - IQ_{low}}{IQ_{high} - IQ_{now}} * (1 - R_2)$$

In this case, can be expressed as:

$$DynamicParam = DynamicParamOld + \frac{IQ_{now} - IQ_{low}}{IQ_{high} - IQ_{now}} * (128 - DynamicParamOld)$$

where N is 128.

Taking a noise processing method of recursive (IIR) filtering as an example, a flow of adjusting an input parameter of the noise processing method and performing noise processing on a raw value is described below in detail in combination with FIG. 6.

S602, a difference set between two raw value sets obtained by driving in two adjacent periods, is found, and a difference with a maximum absolute value in the difference set is determined.

S604, a table label is obtained according to a formula "table label=difference with maximum absolute value/setting parameter".

S606, a ratio parameter DynamicParamOld corresponding to "the table label" is looked up in a ratio parameter table DynamicIIRTable configured on a touch control chip.

S608, it is determined that whether a phase variation φ' of a noise to raw data of a capacitive touch screen is greater than an upper limit $IQ_{high}$ of a phase variation configured on the touch control chip.

5610, DynamicParamOld is adjusted to be 128 when the phase variation φ' is greater than the upper limit $IQ_{high}$ of the phase variation configured on the touch control chip, that is, DynamicParam is 128. 128 refers to 128 portions into which each data RawData in a first processed value set is divided.

It should be understood that 128 here is just an example, and the data RawData in the first processed data set can be divided into any number of portions.

S612, it is determined that whether the phase variation φ' is less than a lower limit $IQ_{low}$ of the phase variation configured on the touch control chip when the variation phase φ' is less than or equal to the upper limit $IQ_{high}$ of the phase variation configured on the touch control chip.

S614, DynamicParamOld is not adjusted when the phase variation φ' is less than the lower limit $IQ_{low}$ of the phase variation configured on the touch control chip, or DynamicParam is equal to DynamicParamOld.

S616, DynamicParamOld may be adjusted according to the following formula when the phase variation φ' is greater than or equal to the lower limit $IQ_{low}$ of the phase variation configured on the touch control chip, to obtain DynamicParam, and the formula is:

$$DynamicParam = DynamicParamOld + \frac{IQ_{now} - IQ_{low}}{IQ_{high} - IQ_{now}} * (128 - DynamicParamOld)$$

S618, recursive (IIR) filtering processing may be performed on each raw data RawDataNow in a first raw value set according to the following formula, to obtain each data RawData in the first processed data set, and the formula is:

$$RawData = \frac{RawDataNow * (128 - DynamicParam) + RawDataLast * DynamicParam}{128}$$

where RawDataLast is data in a second processed data set; and 128 refers to 128 portions into which each data RawData in the first processed value set is divided.

Generally, the greater a variation caused by a noise to raw data of a capacitive touch screen is, the greater a first ratio can be adjusted. Optionally, when the variation caused by the noise to the raw data of the capacitive touch screen is greater than a first threshold, the first ratio may be adjusted to be a maximum value, that is, a second ratio is a maximum value in a range within which the first ratio can take a value, and that is, data in the second processed data set accounts for all data in the first processed data set; and when the variation caused by the noise to the raw data of the capacitive touch screen is less than or equal to a second threshold, the second ratio is equal to the first ratio. The first threshold value may be equal to the second threshold value.

Figure 6:
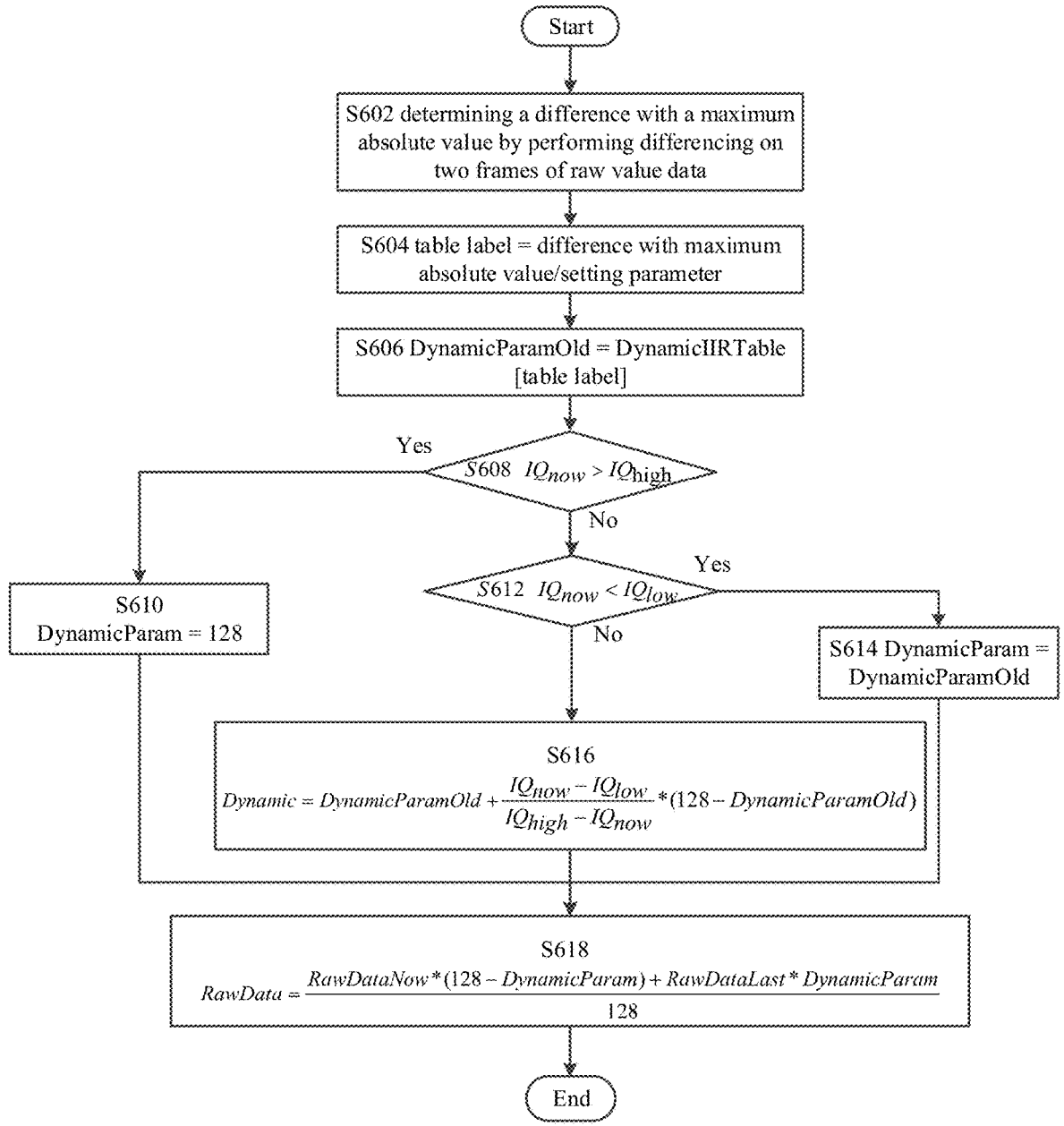
FIG. 6 is a schematic flowchart of a noise cancellation method according to an embodiment of the present disclosure.

It should be understood that the example shown in FIG. 6 is only exemplary, and should not constitute any limit to the present application. For example, a phase variation $IQ_{now}$ caused by the noise to the raw data of the capacitive touch screen may also be replaced with an amplitude variation caused by the noise to the raw data of the capacitive touch screen.

Optionally, before performing noise processing on the first raw value set of the capacitive touch screen according to the variation caused by the noise to the raw data of the capacitive touch screen, the method may include: determining not to perform the noise processing on the first raw value set of the capacitive touch screen when it is determined that the variation caused by the noise to the raw data of the capacitive touch screen is less than or equal to a third threshold, and determining a touch position on the capacitive touch screen directly according to the first raw value set.

Specifically, a difference set between the first raw value set and a reference value may be determined, and then the touch position is determined according to the difference set.

In other words, noise cancellation processing is performed on a raw value of the capacitive touch screen only when the variation caused by the noise to the raw data of the capacitive touch screen is greater than the third threshold value. Various existing noise processing methods can be used, and the noise processing method in the present application can also be used.

This manner can avoid a side effect caused by noise processing that is performed on a raw value less affected by the noise, thereby contributing to improving accuracy of the touch position.

The third threshold value may be less than the foregoing described second threshold value.

It should be noted that, that the touch control chip outputs the drive signal to the capacitive touch screen, described in the foregoing embodiments of the present application, generally refers to outputting a drive signal with a same frequency.

S330, a touch position on the capacitive touch screen is determined according to the first processed data set.

Specifically, a difference set between the first processed data set and a reference value may be determined, and then the touch position is determined according to the difference set.

Figure 7:
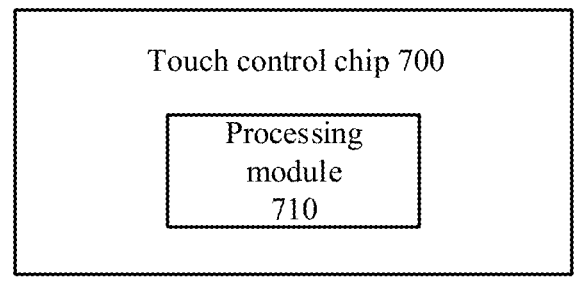
FIG. 7 is a schematic structural diagram of a touch control chip according to an embodiment of the present application.

FIG. 7 is an exemplary structural diagram of a touch control chip according to an embodiment of the present application. It should be understood that a touch control chip 700 illustrated in FIG. 7 is only exemplary, the touch control chip of embodiments of the present application may further include other modules or units, or include modules that are similar in function to various modules in FIG. 7, or not include all modules in FIG. 7.

A processing module 710 is configured to determine a variation caused by a noise to raw data of a capacitive touch screen.

The processing module 710 is further configured to perform noise processing on a first raw value set of the capacitive touch screen according to the variation, to obtain a first processed data set.

The processing module 710 is further configured to determine a touch position on the capacitive touch screen according to the first processed data set.

The touch control chip determines a touch position on a capacitive touch screen according to a variation caused by a noise to raw data of the capacitive touch screen, which contributes to improving accuracy of the touch position.

Optionally, the processing module 710 may be specifically configured to: determine, according to the variation, a first ratio of each second processed data in a second processed data set of the capacitive touch screen to corresponding data in the first processed data set, where the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and perform, by means of recursive filtering, the noise processing on the first raw value set according to the second processed data set and the first ratio, to obtain the first processed data set.

Optionally, the first ratio is 1 when the variation caused by the noise to the raw data of the capacitive touch screen is greater than a first threshold value.

Optionally, the processing module 710 may specifically configured to: determine, according to a maximum difference between a raw value in the first raw value set and second processed data in the second processed data set, a second ratio of each second processed data in the second processed data set to corresponding data in the first processed data set; and obtain the first ratio according to the variation and the second ratio.

Optionally, the first ratio is equal to the second ratio when the variation caused by the noise to the raw data of the capacitive touch screen is less than or equal to a second threshold value.

Optionally, the processing module 710 may be further configured to: determine a phase variation caused by the noise to the raw data of the capacitive touch screen.

Optionally, the processing module 710 is specifically configured to: determine a maximum value in a difference set between a second raw value set of the capacitive touch screen and a reference value set, where the second raw value set is the raw value set acquired when the drive signal with the first frequency is output to the capacitive touch screen; determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired when the drive signal with the first frequency is output to the capacitive touch screen.

Optionally, the phase variation $\varphi'$ satisfies the following formula:

$$\varphi' = \sum_{i=1}^{M} |\varphi_{i1} - \varphi_{i2}|$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data.

Optionally, the first ratio and the second ratio may satisfy the following formula:

$$R_1 = R_2 + \frac{IQ_{now} - IQ_{low}}{IQ_{high} - IQ_{now}} * (1 - R_2)$$

where $R_1$ is the first ratio, $R_2$ is the second ratio, $IQ_{high}$ is an upper limit value of the phase variation, and $IQ_{low}$ is a lower limit value of the phase variation.

Correspondingly, the second processed data set, the first ratio and the first raw value set satisfy the following formula:

RawData=RawDataNow*(1−$R_1$)+RawDataLast*$R_1$ where RawData is data in the first processed data set, RawDataNow is data in the first raw value set, and RawDataLast is data in the second processed data set.

Optionally, the processing module 710 may be further configured to determine the touch position of the capacitive touch screen according to the first raw value set and a reference value set when the variation caused by the noise to the raw data of the capacitive touch screen is less than or equal to a third threshold value.

The touch control chip shown in FIG. 7 can perform various steps in the method shown in FIG. 3, which will not be repeated redundantly here for the simplicity.

Figure 8:
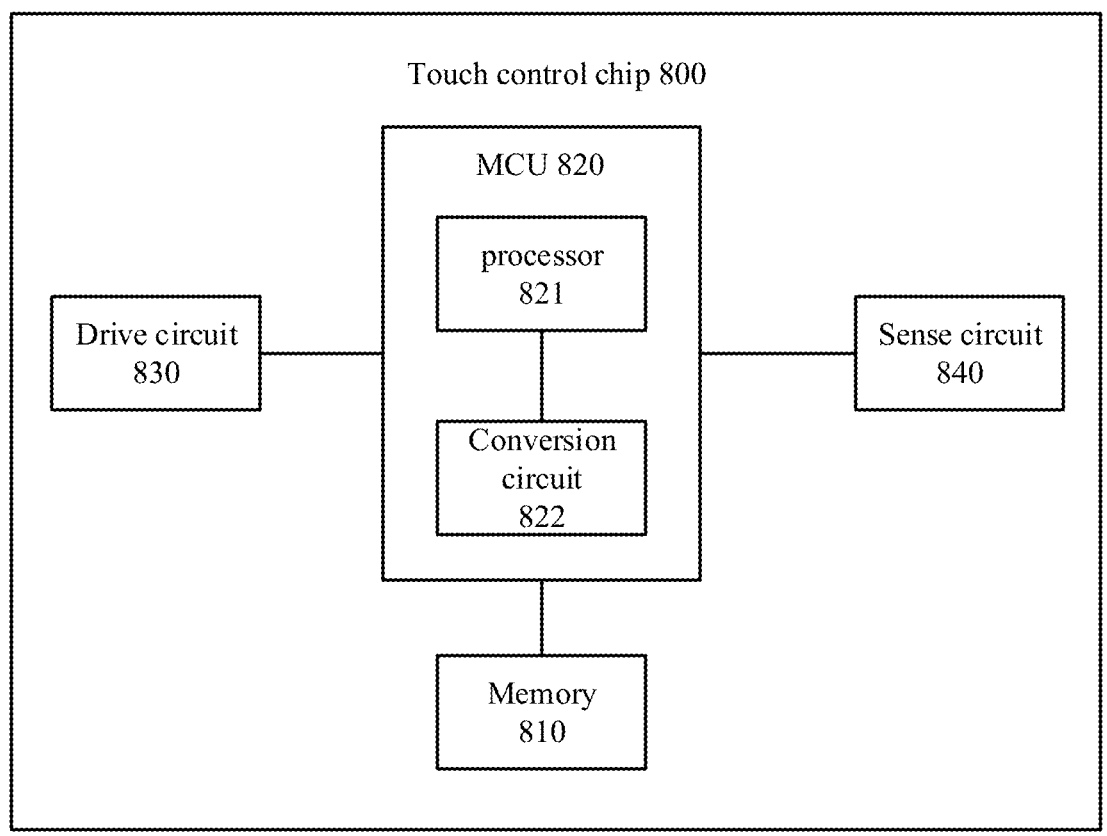
FIG. 8 is a schematic structural diagram of a touch control chip according to another embodiment of the present application.

FIG. 8 is a schematic structural diagram of a touch control chip according to another embodiment of the present application. It should be understood that a touch control chip 800 illustrated in FIG. 8 is only exemplary, the touch control chip of embodiments of the present application may further include other modules or units, or include modules that are similar in function to various modules in FIG. 8.

A memory 810 is configured to store a computer program code, a reference value set, a captured raw value set and raw data set, and the like.

A processor 821 in an MCU 820 is configured to perform the computer program code stored in the memory, and can control a drive circuit 830 to output a drive signal with a corresponding frequency to a touch screen, so as to drive the touch screen to work, and the processor 821 is further configured to acquire the raw value set, and detect a touch position or the like according to the raw value set and the like.

A conversion circuit 822 generates the raw data set according to a sense signal captured from the touch screen by a sense circuit 840.

The drive circuit 830 outputs the drive signal with the corresponding frequency to the touch screen under the control of the MCU 820.

The sense circuit 840 captures the sense signal output by the touch screen under the control of the MCU 820.

Specifically, the processor 821 is configured to determine a variation caused by a noise to raw data of a capacitive touch screen.

The processor 821 is further configured to perform noise processing on a first raw value set of the capacitive touch screen according to the variation, to obtain a first processed data set.

The processor 821 is further configured to determine a touch position on the capacitive touch screen according to the first processed data set.

Optionally, the processor 821 may be specifically configured to:

determine, according to the variation, a first ratio of each second processed data in a second processed data set of the capacitive touch screen to corresponding data in the first processed data set, where the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and perform, by means of recursive filtering, the noise processing on the first raw value set according to the second processed data set and the first ratio, to obtain the first processed data set.

Optionally, the first ratio is 1 when the variation is greater than a configured first threshold value.

Optionally, the processor 821 may be specifically configured to:

determine, according to a maximum difference between a raw value in the first raw value set and second processed data in the second processed data set, a second ratio of each second processed data in the second processed data set to corresponding data in the first processed data set; and obtain the first ratio according to the variation and the second ratio.

Optionally, the first ratio is equal to the second ratio when the variation is less than or equal to a configured second threshold value.

Optionally, the variation caused by the noise to the raw data of the capacitive touch screen includes a phase variation caused by the noise to the raw data of the capacitive touch screen.

Optionally, the processor 821 may be specifically configured to:

determine a maximum value in a difference set between a second raw value set of the capacitive touch screen and a reference value set, where the second raw value set is the raw value set acquired when the drive signal with the first frequency is output to the capacitive touch screen;

determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired when the drive signal with the first frequency is output to the capacitive touch screen.

Optionally, the phase variation $\varphi'$ satisfies the following formula:

$$\varphi' = \sum_{i=1}^{M} |\varphi_{i1} - \varphi_{i2}|$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data.

Optionally, the first ratio and the second ratio satisfy the following formula:

$$R_1 = R_2 + \frac{IQ_{now} - IQ_{low}}{IQ_{high} - IQ_{now}} * (1 - R_2)$$

where $R_1$ is the first ratio, $R_2$ is the second ratio, $IQ_{high}$ is an upper limit value of the phase variation, and $R_2$ is a lower limit value of the phase variation; and the second processed data set, the first ratio and the first raw value set satisfy the following formula:

$$RawData = RawDataNow * (1 - R_1) + RawDataLast * R_1$$

where RawData is data in the first processed data set, RawDataNow is data in the first raw value set, and RawDataLast is data in the second processed data set.

Optionally, the processor 821 is further configured to determine the touch position of the capacitive touch screen according to the first raw value set and a reference value set when the variation is less than or equal to a third threshold value.

The touch control chip shown in FIG. 8 can perform various steps in the method shown in FIG. 3, which will not be repeated redundantly here for the simplicity.

Those of ordinary skill in the art may be aware that, units and algorithm steps of the examples described in the embodiments disclosed in this paper may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered to be beyond the scope of the present application.

Those skilled in the art to which the present disclosure pertains may clearly understand that, for the convenience and simplicity of description, the specific working processes of the system, the apparatus and the units described above, may refer to corresponding processes in the foregoing method embodiments, and will not be repeated redundantly herein.

In the several embodiments provided in the present application, it should be understood that, the disclosed system, apparatus and method may be implemented in other manners. For example, the embodiments of the above-described apparatus are only exemplary, for example, the division of the units is only a logic function division, other division modes may be adopted in practice, e.g., multiple units or components may be combined or integrated in another system, or some characteristics may be omitted or be not executed. As another point, the displayed or discussed mutual coupling or direct coupling or communication connection may be indirect coupling or communication connection via some interfaces, apparatuses or units, and may be in electrical, mechanical or other forms.

The units described as separate components may be or may not be separated physically, components displayed as units may be physical units or not, namely, may be located in one place, or may be distributed on a plurality of network units. A part of or all of the units may be selected according to actual demand to implement the purposes of the technical solutions in the embodiments.

In addition, the functional units in the embodiments of the present application may be integrated in a processing unit, or the units singly exist physically, or two or more units are integrated in one unit.

The foregoing embodiments may be implemented in whole or in part by software, hardware, firmware, or any combination thereof. When implemented using software, the embodiments may be implemented in whole or in part in the form of a computer program product. The computer program product includes one or more computer instructions. When the computer program instructions are loaded and executed on a computer, procedures or functions described in accordance with the embodiments of the present application are generated in whole or in part. The computer can be a general purpose computer, a special purpose computer, a computer network, or another programmable apparatus. The computer instructions can be stored in a computer readable storage medium or transferred from one computer readable storage medium to another computer readable storage medium, for example, the computer instructions can be transferred from a website, computer, server or data center to another website, computer, server, or data center wiredly (such as, a coaxial cable, an optical fiber, a digital subscriber line (DSL) or wirelessly (such as, infrared, wireless, microwave, and the like). The computer readable storage medium can be any available medium that can be accessed by a computer, or a data storage device that includes a server, a data center, or the like that is integrated by one or more available media. The available medium may be a magnetic medium (such as, a floppy disk, a hard disk, a magnetic tape), an optical medium (such as, a DVD), or a semiconductor medium (such as, a solid state disk (SSD)) or the like.

Described above are the specific embodiments of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the claims should prevail over the protection scope of the present application.

What is claimed is:

1. A method for determining a touch position, comprising:
determining a variation caused by a noise to raw data of a capacitive touch screen;
performing noise processing on a first raw value set of the capacitive touch screen according to the variation, to obtain a first processed data set;
determining a touch position on the capacitive touch screen according to the first processed data set; and
wherein the performing the noise processing on the first raw value set of the capacitive touch screen according to the variation, to obtain the first processed data set comprises: determining, according to the variation, a first ratio of each second processed data in a second processed data set of the capacitive touch screen to corresponding data in the first processed data set, wherein the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and performing, by means of recursive filtering, the noise processing on the first raw value set according to the second processed data set and the first ratio, to obtain the first processed data set.

2. The method according to claim 1, wherein the first ratio is 1 when the variation is greater than a configured first threshold value.

3. The method according to claim 1, wherein the determining, according to the variation, the first ratio of each second processed data in the second processed data set of the capacitive touch screen to the corresponding data in the first processed data set comprises:

determining, according to a maximum difference between a raw value in the first raw value set and second processed data in the second processed data set, a second ratio of each second processed data in the second processed data set to corresponding data in the first processed data set; and
obtaining the first ratio according to the variation and the second ratio.

4. The method according to claim 3, wherein the first ratio is equal to the second ratio when the variation is less than or equal to a configured second threshold value.

5. The method according to claim 4, wherein the variation caused by the noise to the raw data of the capacitive touch screen comprises a phase variation caused by the noise to the raw data of the capacitive touch screen.

6. The method according to claim 5, wherein the determining the variation caused by the noise to the raw data of the capacitive touch screen comprises:
determining a maximum value in a difference set between a second raw value set of the capacitive touch screen and a reference value set, wherein the second raw value set is the raw value set acquired when the drive signal with the first frequency is output to the capacitive touch screen;
determining a first sensing terminal corresponding to the maximum value; and
determining the phase variation according to a phase difference between raw data corresponding to the first sensing terminal in a first raw data set of the capacitive touch screen and raw data corresponding to the first sensing terminal in a second raw data set, wherein the first raw data set and the second raw data set are acquired when the drive signal with the first frequency is output to the capacitive touch screen.

7. The method according to claim 6, wherein the phase variation φo' satisfies the following formula:

$$\varphi' = \sum_{i=1}^{M} |\varphi_{i1} - \varphi_{i2}|$$

wherein M is a number of raw data corresponding to the first sensing terminal in the first raw data set, $\varphi_{i1}$ is a phase of $i^{th}$ raw data corresponding to the first sensing terminal in the first raw data set, and $\varphi_{i1}$ is a phase of $i^{th}$ raw data corresponding to the first sensing terminal in the second raw data set.

8. The method according to claim 3, wherein the first ratio and the second ratio satisfy the following formula:

$$R_1 = R_2 + \frac{IQ_{now} - IQ_{low}}{IQ_{high} - IQ_{now}} * (1 - R_2)$$

wherein $R_1$ is the first ratio, $R_2$ is the second ratio, $IQ_{high}$ is an upper limit value of a phase variation, and $IQ_{low}$ is a lower limit value of the phase variation; and
the second processed data set, the first ratio and the first raw value set satisfy the following formula:

RawData=RawDatallow*(1−$R_1$)+RawDataLast*$R_1$ wherein RawData is data in the first processed data set, RawDatallow is data in the first raw value set, and RawDataLast is data in the second processed data set.

9. The method according to claim 1, wherein the method further comprises:
   determining the touch position of the capacitive touch screen according to the first raw value set and a reference value set when the variation is less than or equal to a third threshold value.

10. A touch control chip, comprising:
   a processing module configured to determine a variation caused by a noise to raw data of a capacitive touch screen;
   the processing module further configured to perform noise processing on a first raw value set of the capacitive touch screen according to the variation, to obtain a first processed data set;
   the processing module further configured to determine a touch position on the capacitive touch screen according to the first processed data set; and
   wherein the processing module is configured to: determine, according to the variation, a first ratio of each second processed data in a second processed data set of the capacitive touch screen to corresponding data in the first processed data set, wherein the second processed data set is obtained prior to the determination, by recursively filtering a raw value set acquired when a drive signal with a first frequency is output to the capacitive touch screen, and the first frequency is a frequency of the drive signal output to the capacitive touch screen when the first raw value set is acquired; and perform, by means of recursive filtering, the noise processing on the first raw value set according to the second processed data set and the first ratio, to obtain the first processed data set.

11. The touch control chip according to claim 10, wherein the first ratio is 1 when the variation is greater than a configured first threshold value.

12. The touch control chip according to claim 10, wherein the processing module is configured to:
   determine, according to a maximum difference between a raw value in the first raw value set and second processed data in the second processed data set, a second ratio of each second processed data in the second processed data set to corresponding data in the first processed data set; and
   obtain the first ratio according to the variation and the second ratio.

13. The touch control chip according to claim 12, wherein the first ratio is equal to the second ratio when the variation is less than or equal to a configured second threshold value.

14. The touch control chip according to claim 13, wherein the variation caused by the noise to the raw data of the capacitive touch screen comprises a phase variation caused by the noise to the raw data of the capacitive touch screen.

15. The touch control chip according to claim 14, wherein the processing module is configured to:
   determine a maximum value in a difference set between a second raw value set of the capacitive touch screen and a reference value set, wherein the second raw value set is the raw value set acquired when the drive signal with the first frequency is output to the capacitive touch screen;
   determine a first sensing terminal corresponding to the maximum value; and
   determine the phase variation according to a phase difference between raw data corresponding to the first sensing terminal in a first raw data set of the capacitive touch screen and raw data corresponding to the first sensing terminal in a second raw data set, wherein the first raw data set and the second raw data set are acquired when the drive signal with the first frequency is output to the capacitive touch screen.

16. The touch control chip according to claim 15, wherein the phase variation go' satisfies the following formula:

$$\varphi' = \sum_{i=1}^{M} |\varphi_{i1} - \varphi_{i2}|$$

wherein M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

17. The touch control chip according to claim 12, wherein the first ratio and the second ratio satisfy the following formula:

$$R_1 = R_2 + \frac{IQ_{now} - IQ_{low}}{IQ_{high} - IQ_{now}} * (1 - R_2)$$

wherein $R_1$ is the first ratio, $R_2$ is the second ratio, $IQ_{high}$ is an upper limit value of a phase variation, and $IQ_{low}$ is a lower limit value of the phase variation; and
   the second processed data set, the first ratio and the first raw value set satisfy the following formula:

RawData=RawDatallow*(1−$R_1$)+RawDataLast*$R_1$ wherein RawData is data in the first processed data set, RawDatallow is data in the first raw value set, and RawDataLast is data in the second processed data set.

18. The touch control chip according to claim 10, wherein the processing module is further configured to determine the touch position of the capacitive touch screen according to the first raw value set and a reference value set when the variation is less than or equal to a third threshold value.

* * * * *